United States Patent

Gilbert et al.

[11] Patent Number: 4,821,829
[45] Date of Patent: Apr. 18, 1989

[54] AIR CUSHION VEHICLE

[75] Inventors: Ronald C. Gilbert; Robert R. Henvest, both of Southampton, England

[73] Assignee: H. S. I. Products, Inc., Eddystone, Pa.

[21] Appl. No.: 80,744

[22] Filed: Jul. 31, 1987

[51] Int. Cl.⁴ .............................................. B60V 1/16
[52] U.S. Cl. ................................................. 180/127
[58] Field of Search .............. 180/116, 117, 118, 122, 180/127

[56] References Cited

U.S. PATENT DOCUMENTS

| 3,420,330 | 1/1969 | Bliss | 180/127 |
| 3,424,266 | 1/1969 | Lockerell | 180/127 |
| 3,429,395 | 2/1969 | Beardsley | 180/127 |
| 3,444,952 | 5/1969 | Clarke | 180/127 |
| 3,870,121 | 3/1975 | Schneider | 180/117 |

Primary Examiner—David M. Mitchell
Assistant Examiner—Richard Camby
Attorney, Agent, or Firm—Z. T. Wobensmith, III

[57] ABSTRACT

An air cushion vehicle capable of operation over land or water, which includes a hull carrying at least one air supply unit, an outer inflatable member connected to and extending around the entire perimeter of the hull, which supports a flexible skirt system which extends down from the inflatable member, which it is part of, and air under pressure is supplied by the air supply unit to the skirt system in a regulated manner, to provide a balanced cushion at the bow, sides and stern and to prevent decaying of the cushion and ploughing. Self contained ballast apparatus is provided to trim the vehicle.

8 Claims, 11 Drawing Sheets

AIR CUSHION VEHICLE

BACKGROUND OF THE INVENTION

1. Field of the Invention

This invention relates to an air cushion vehicle of the skirted type with a composite hull which includes an inflatable to provide buoyancy and which surrounds a hard structure, wherein the propulsion, seating and controls are contained. The skirt system provides a balanced flow of air around the perimeter of the vehicle to prevent rapid cushion decay which may result in "plough in" of the vehicle.

1. Description of the Prior Art

Considerable development work has been done in the field of air cushion vehicles, which are more popularly known as hovercraft. Many of such craft are designed to be used both on land and water.

Examples of prior art structures are shown in the U.S. patents to Bliss U.S. Pat. No. 3,420,330; Cockerell U.S. Pat. No. 3,424,266; Beardsley U.S. Pat. No. 3,429,395; Clarke U.S. Pat. No. 3,444,952; Schneider U.S. Pat. No. 3,970,121; and the British patents to Winter No. 1,176,642; Latimer-Needham No. 1,245,454; Welfare No. 1,275,053; Riddle No. 1,306,687; Paoli No. 1,381,806; and Peissel et al. No. 1,479,315.

When using air cushion vehicles on water, and particularly with smaller craft when moving at speed across water they will operate satisfactorily if the flow of air into the cushion is maintained. If the vehicle moves downwind, the drag, and therefore the thrust required to maintain speed, decreases. Under certain conditions the volume of air fed into the cushion may decrease. If this reduction allows the cushion to decay the craft will "plough in", and cause the occupants to be thrown in the direction of the "plough-in" with possible resultant injury to the vehicle and its occupants.

None of the prior art structures provides an effective solution to the ploughing tendencies of air cushion vehicles resulting from the decay of the air cushion, and particularly where this occurs at the bow of the vehicle.

In order to overcome the "plough-in" tendency a skirt system was developed which prevents "plough-in". The system provides a balance between the volume of air fed into the cushion, and the amount fed to the individual segments comprising the skirt that forms a seal around the cushion and is satisfactory whether the vehicle operates on land or water.

The vehicle can be provided with a ballast system for trim and also provides additional positive advantages not found in the prior art structures.

SUMMARY OF THE INVENTION

This invention relates to an air cushion vehicle for use over land or water which provides a regulated balanced air flow around the perimeter of the vehicle.

The principal object of the invention is to provide an air cushion vehicle wherein the air cushion supports the vehicle regardless of the speed or terrain.

A further object of the invention is to provide an air cushion vehicle of the character aforesaid which may be constructed in a variety of sizes.

A further object of the invention is to provide an air cushion vehicle of the character aforesaid which is simple to construct and easy to operate.

A further object of the invention is to provide an air cushion vehicle of the character aforesaid which provide a higher degree of safety than prior art designs.

A further object of the invention is to provide an air cushion vehicle of the character aforesaid which can be provided with an optional ballast system to improve the vehicles trim.

A further object of the invention is to provide a craft which obtains buoyancy from a compartmental inflatable, and a propulsion system which meets the appropriate marine requirements for displacement craft (i.e. boats) of a similar size and weight.

Other objects and advantageous features will be apparent from the description and claims.

DESCRIPTION OF THE DRAWINGS

The nature and characteristic features of the invention will be more readily understood from the following description taken in connection with the accompanying drawings forming part hereof in which.

Figure 1:
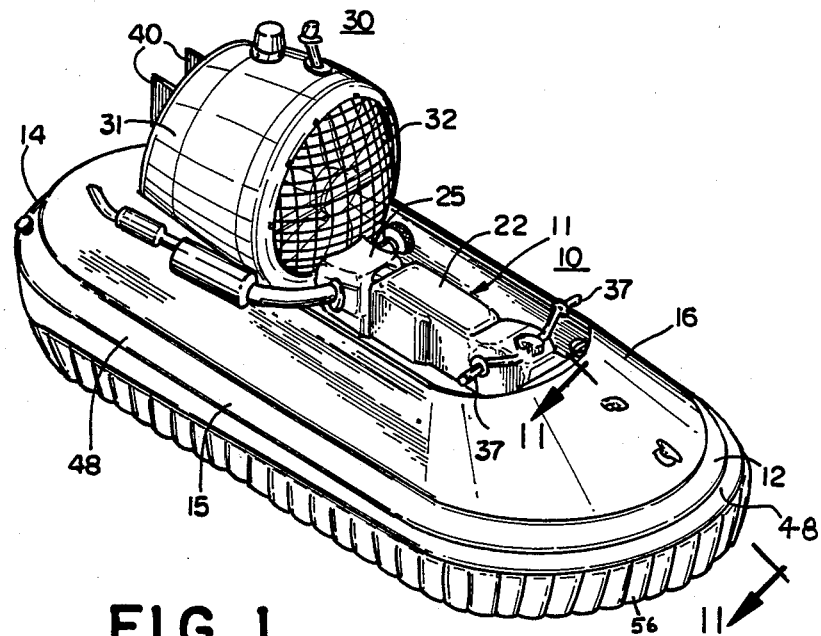
FIG. 1 is a perspective view of an air cushion vehicle incorporated the invention.
Figure 2:
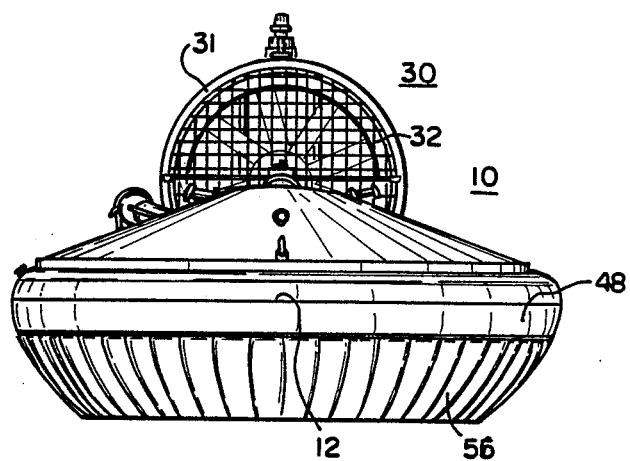
FIG. 2 is a front elevational view of the air cushion vehicle of FIG. 1.
Figure 3:
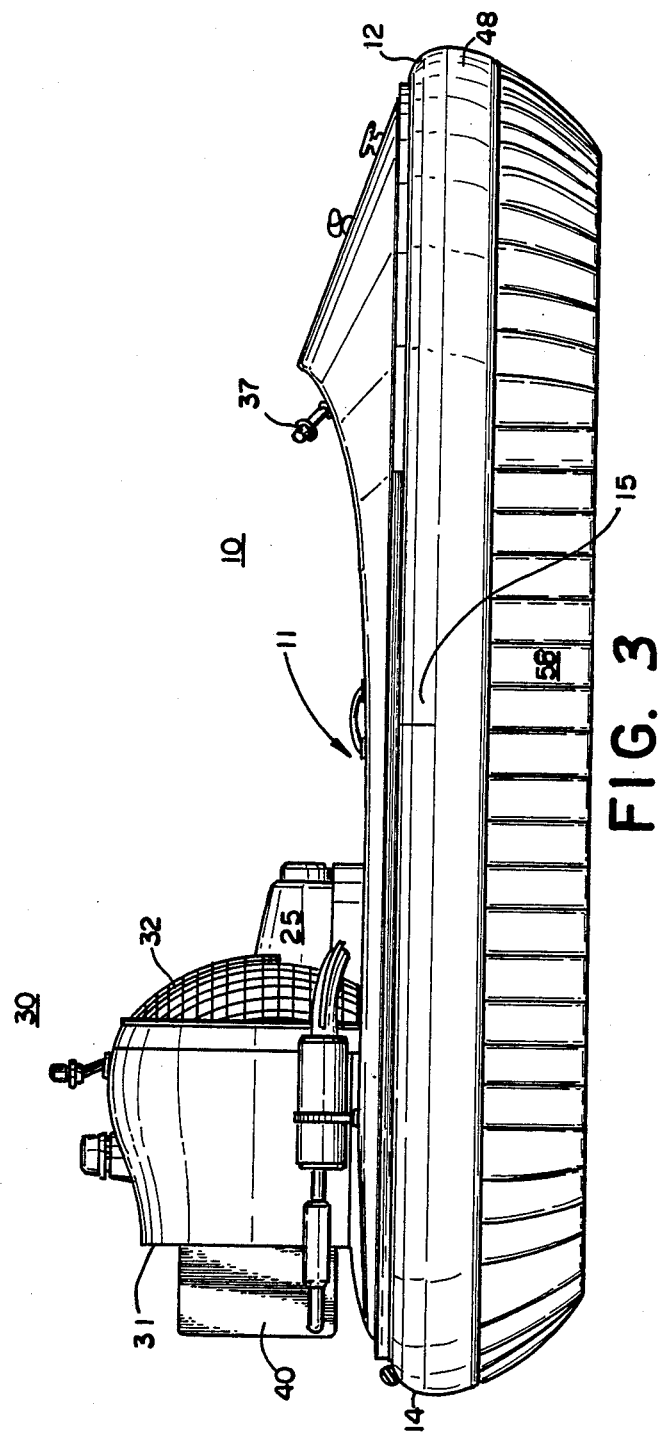
FIG. 3 is a side elevational view of the air cushion vehicle of FIG. 1.
Figure 4:
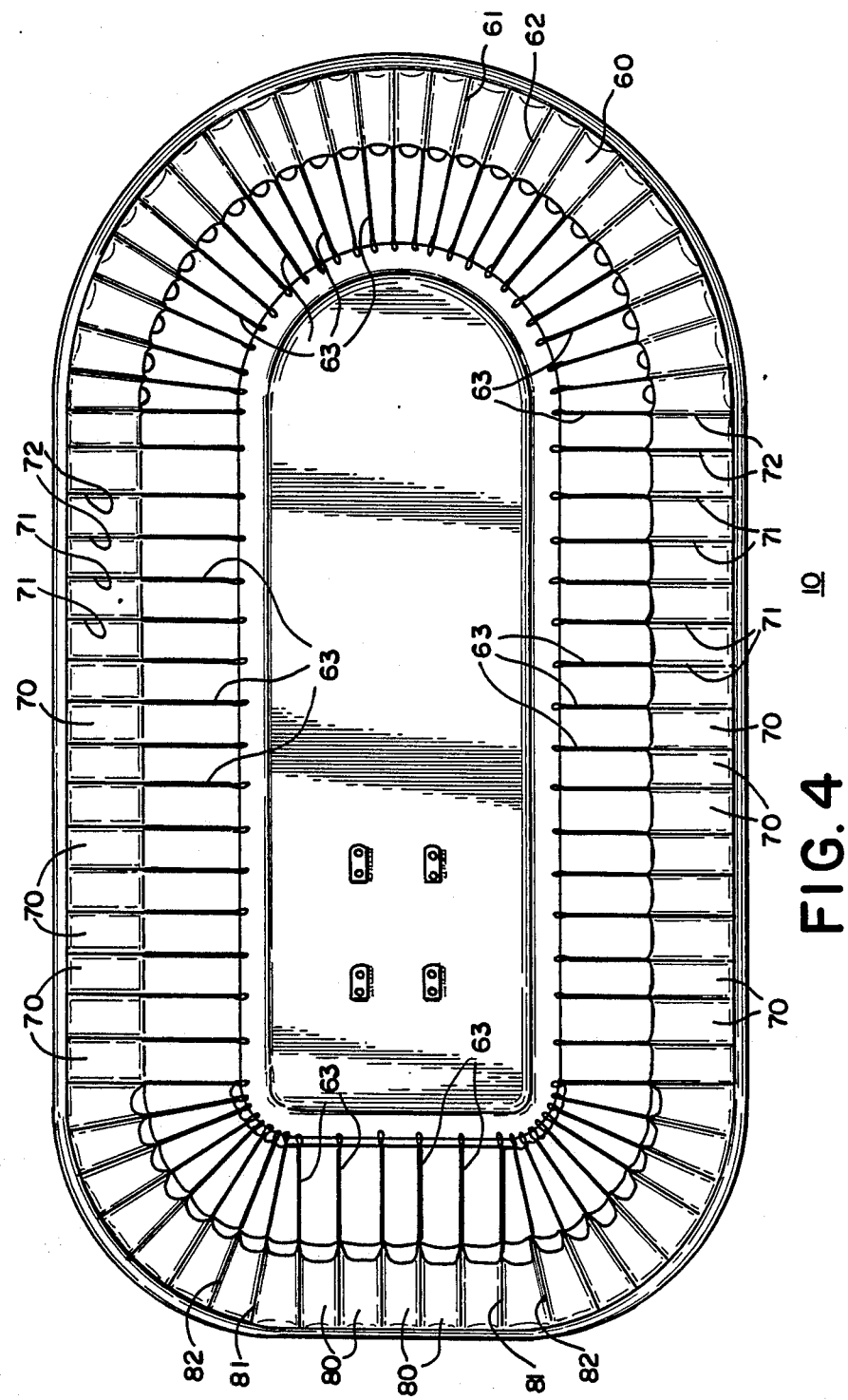
FIG. 4 is a bottom elevational view of the air cushion vehicle of FIG. 1.
Figure 5:
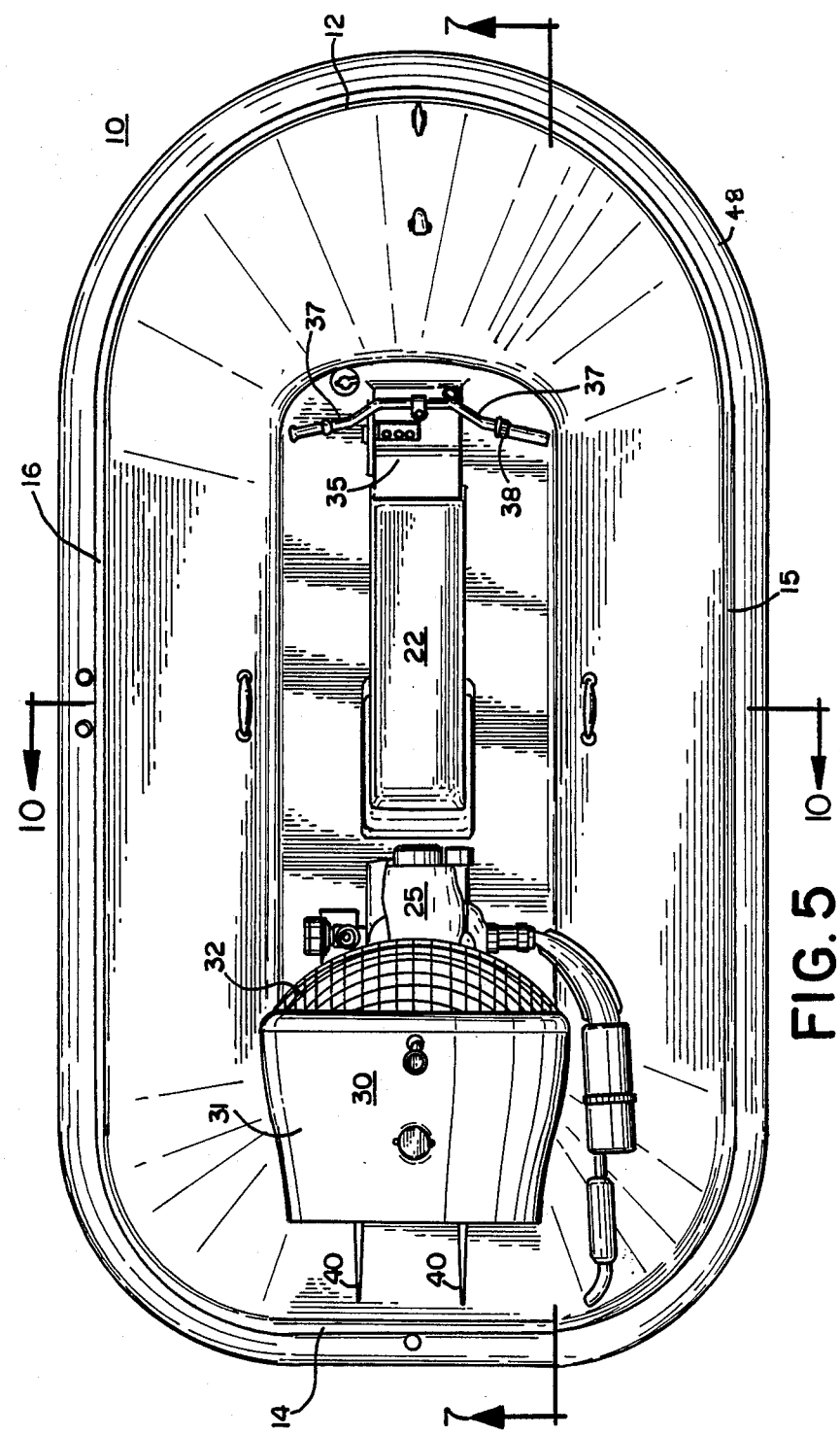
FIG. 5 is a top elevational view of the air cushion vehicle of FIG. 1.
Figure 6:
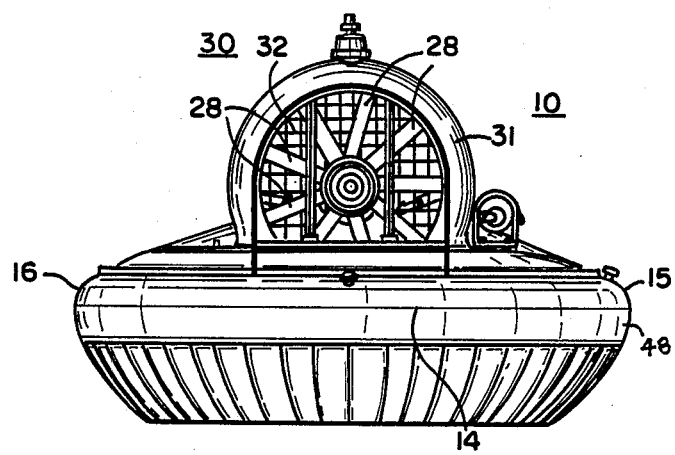
FIG. 6 is a front elevational view of the air cushion vehicle of FIG. 6.
Figure 10:
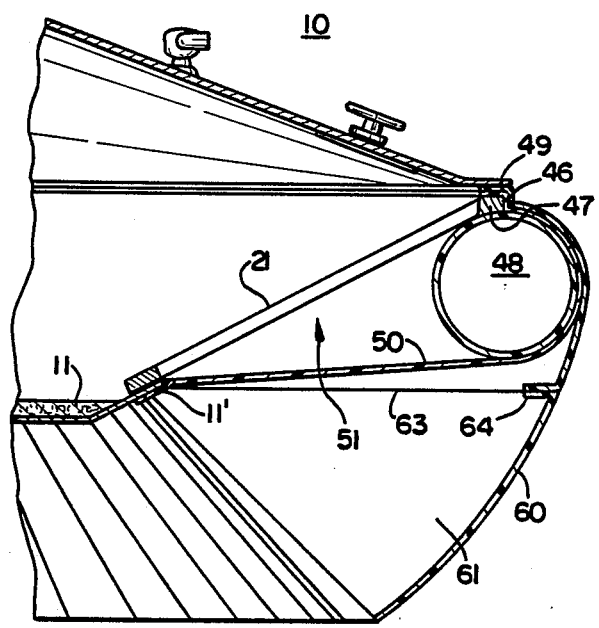
FIG. 10 is a fragmentary vertical sectional view taken approximately on the line 11—11 of FIG. 1.

It should, of course, be understood that the description and drawings herein are illustrative merely and that various modifications and changes can be made in the structure disclosed without departing from the spirit of the invention.

Like numerals refer to like parts throughout the several views.

DESCRIPTION OF THE PREFERRED EMBODIMENTS

Referring now more particulary to the drawings and FIGS. 1 to 11, 14 inclusive, one embodiment of air cushion vehicle 10 is illustrated, which includes an inflatable tubular member 48 of circular section, a cockpit 11, preferably formed of reinforced fibreglass of well known type with an integral deck 18. Contained within the cockpit are inflatable buoyancy chambers 19 formed of a reinforced air-tight flexible plastic material.

Mounted on the forward part of the deck 18 is a compartment 23 with a hinged lid, forming a seat 22, in the version illustrated, which seats two people. The compartment 23 can be used for the stowage of loose equipment. The deck 18 behind the seat 22 has an engine mount 24 attached therto, to which a propulsion unit illustrated as an engine 25 of well known type is secured. The engine 25 has a gear box 26 with an output shaft 27 to which propeller blades 28 (nine being illustrated), of well known type are fastened and preferably at an angle of 45°. In the illustrated embodiment a preferred engine is a Rotax Model 503, 2 cylinder engine of 55 cc, rated at 36 B.H.P., and at 7,000 RPM providing approximately 130 pounds of thrust, with the propeller blades 28 travelling at 3,500 RPM. The Rotax Model 503 engine is available from Kodiak Research Ltd., Vancouver, B.C., Canada.

The propeller blades 28 are contained within a duct assembly 30 which is mounted to the deck 18 and includes a tapered outer housing 31 open at the ends, with a screen 32 closing off the housing 31 adjacent the engine 25. The housing 31 can be formed of any well known lightweight plastic material, with reinforced molded fibreglass being particularly suitable. The seat 22 at the forwardmost or bow end of the hull 11, has an integral console 35 in which is mounted a shaft 36.

The shaft 36 has handlebars 37 attached thereto, one handlebar 37 being provided with a twist grip control 38 for controlling the gas supply to the engine 25 in well known manner. The shaft 36 has cables (not shown) attached thereto and to a pair of rudders 40 mounted to the outer deck 20, inside of the duct assembly 30, for movement of the rudders 40 and control of the direction of the vehicle 10.

At the forward end of the vehicle 10, an inner ballast bag 20 is provided which can be filled with water, which displaces the air therein. The bag can be filled by a valve and pump (not shown) and can be emptied by the pressure of air in the inflatable. The water in the bag is used to change the weight distribution in the vehicle 10, and thereby the trim of the vehicle 10 in a well known manner.

Figure 7:
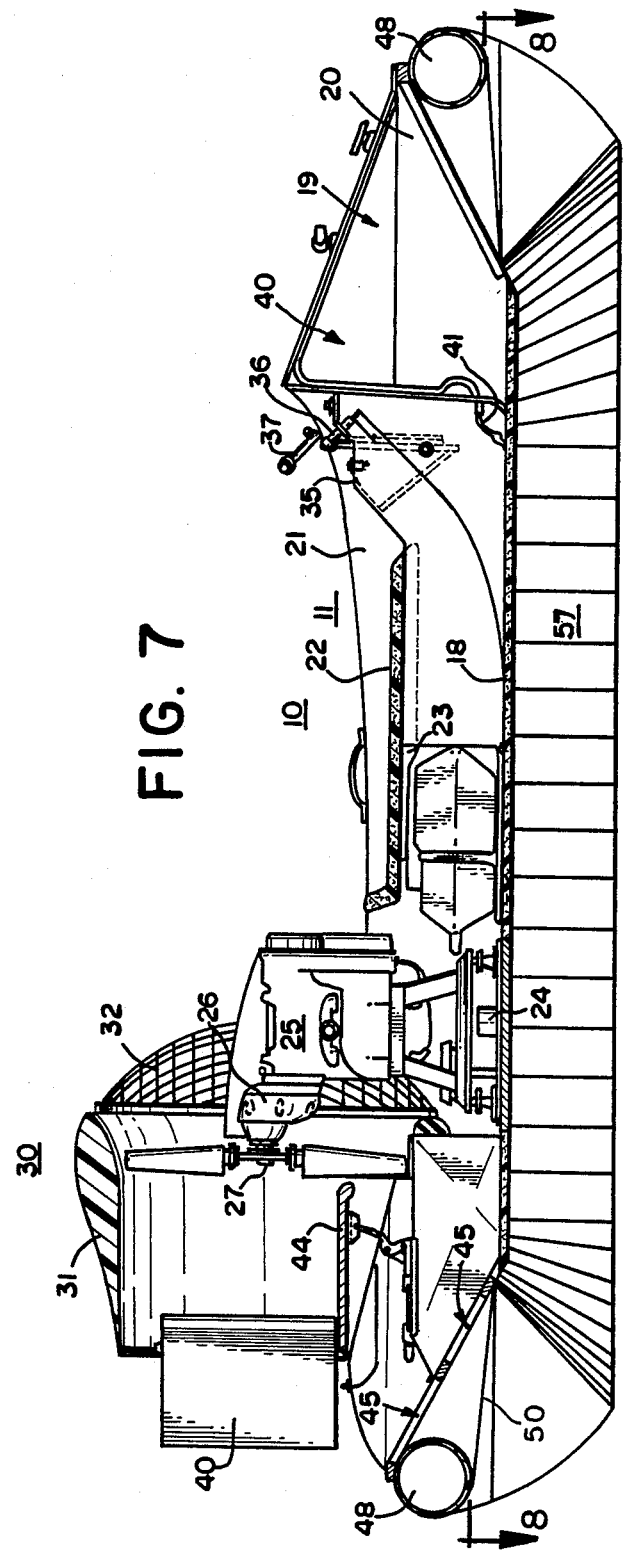
FIG. 7 is a vertical sectional view taken approximately on the line 7—7 of FIG. 5.

As seen more particularly in FIG. 7, the embodiment of vehicle 10 illustrated is provided with an air splitter board 44 fixed in position to the rear, and adjacent to the propeller blades 28 to cause a proportion of the air, in this case approximately 30% to be diverted under the splitter board 44 and through holes 45 in the inner wall 21 of the cockpit 11.

While an air splitter board is illustrated in the disclosed embodiment, it is contemplated that the supplied air for the cushion and the air supplied for vehicle movement can be provided by multiple air supply units dependent on the design requirements of the vehicle.

The outer extremity of the hull 1 has a downwardly extending flange 46 moulded therein which receives the edge 47 of the inflatable tubular member 48. The tubular member 48 is separate from the propulsion unit and can be inflated by any desired means such as an air pump (not shown) through an air valve (not shown). Attached to the lower edge of inflatable member 48 is a membrane 50 constructed of rubberized air-tight material, the inner edge of this membrane is then attached to the lower portion 11' of the hull structure 11.

The membrane 50 is provided with a series of openings 52, 52A, 53 and 44 which permit air under pressure to flow outwardly or downwardly, to be described.

In the preferred embodiment of FIG. 7, approximately 30% of the air from the duct assembly 30 is directed under the splitter board 44 through the holes 45 and into the space 51.

Figure 8:
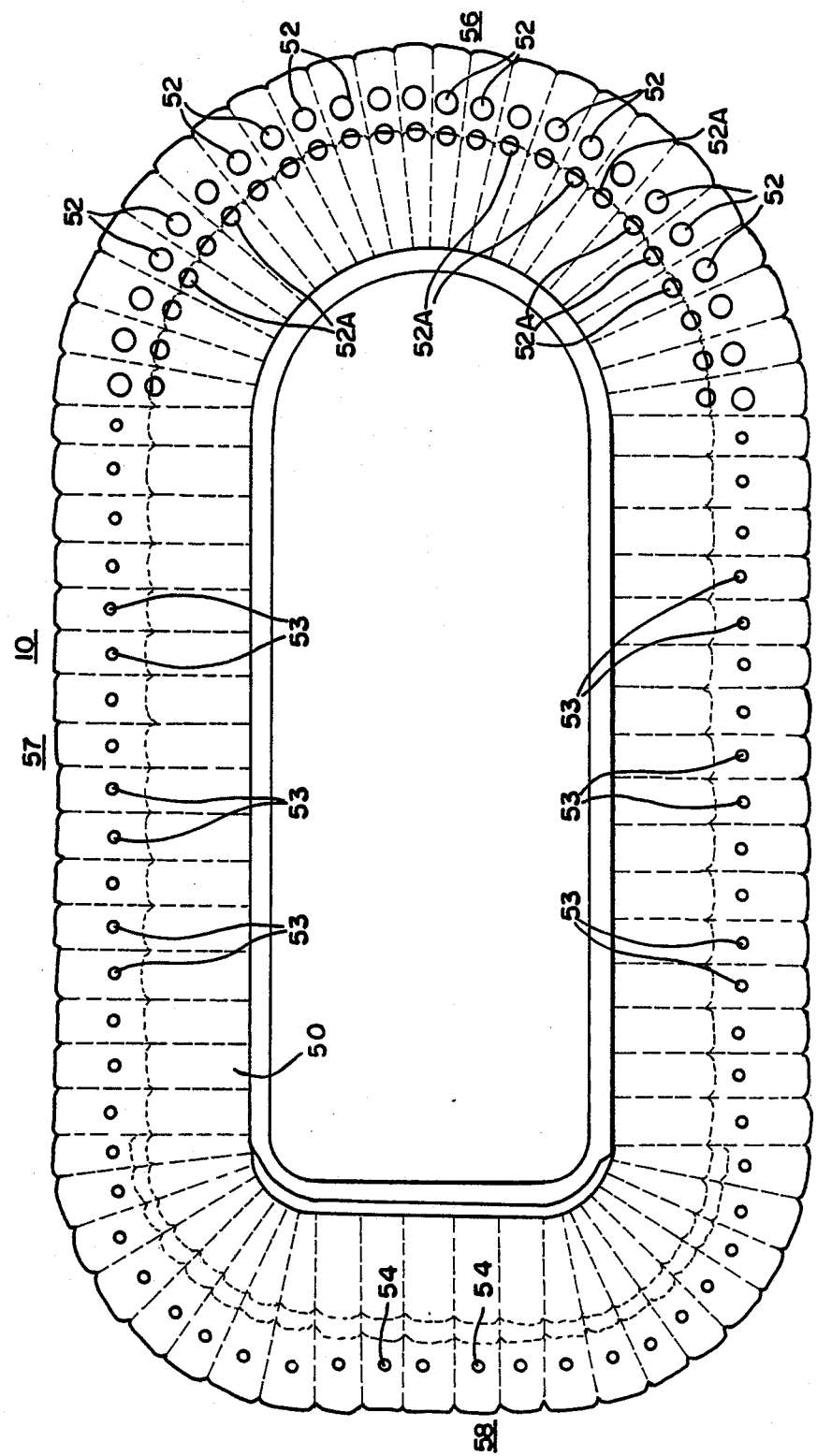
FIG. 8 is a horizontal sectional view taken approximately on the line 8—8 of FIG. 7.
Figure 16:
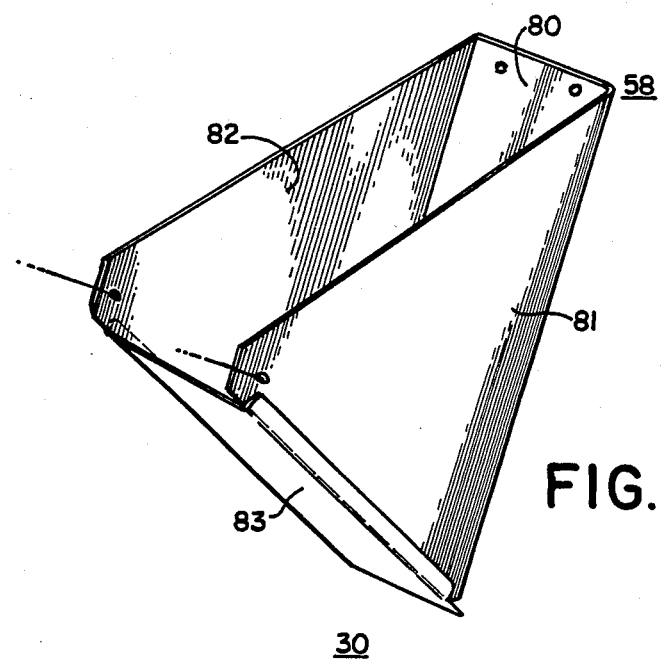
FIG. 16 is a perspective view of another version of skirt segment.
Figure 9:
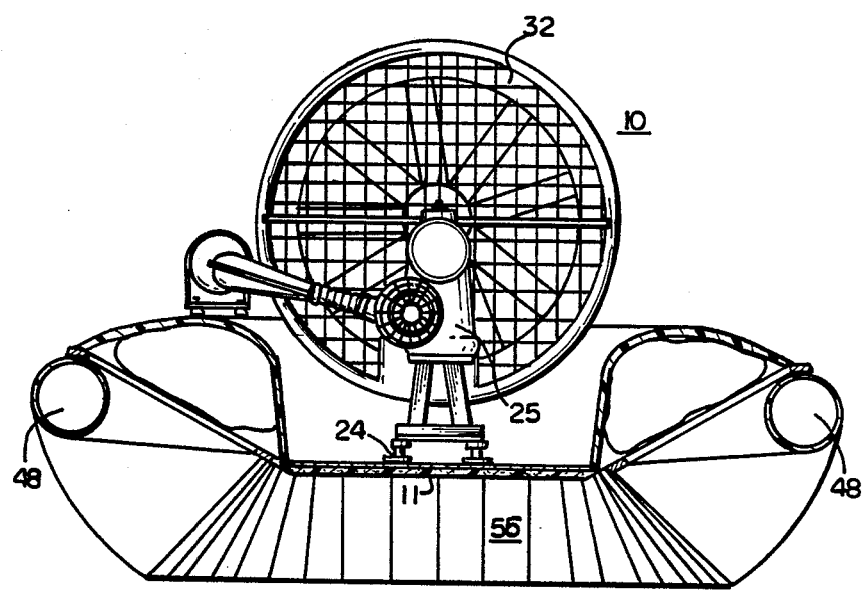
FIG. 9 is a vertical sectional view taken approximately on the line 10—10 of FIG. 5.
Figure 11:
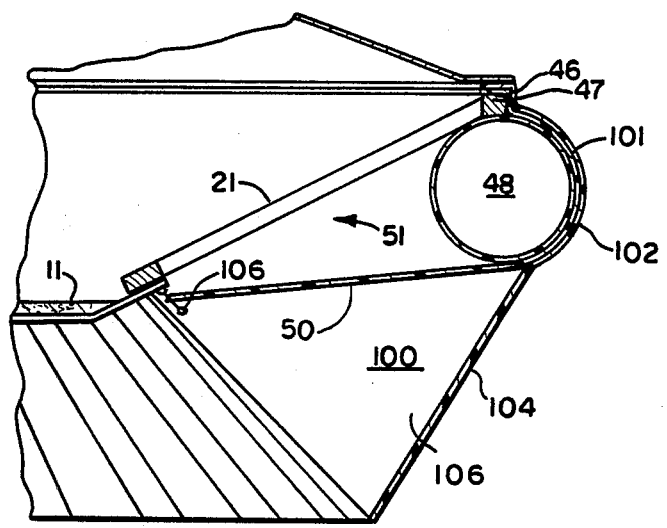
FIG. 11 is a view similar to FIG. 10 illustrating another version of skirt arrangement.

Also attached to the inflatable member 48 is a wall 49 to which are attached a plurality of groups of segments 56, 57 and 58. These segments are attached to the lower portion of the hard structure at their inner extremeties, and cooperate to form a perimeteral air cushion to support the vehicle. The segments 56 located at the bow 12 are of U-shaped configuration, particularly as seen in FIGS. 8 and 11, and each include an outer wall 60, side walls 61 and 62 and a tie back 63 which is fastened to a projection 64 on the wall 60 and attached to the hull with member 50 in well known manner.

The outer wall 60 is attached to the lower edge of wall 49. The wall 50, at each segment 56, is provided with an opening 52 which in the preferred embodiment is of 2½ inch diameter and is also provided with an opening 52A for each segment 56, of 2 inch diameter to permit air under pressure to flow from space 51 down and against walls 60 of the segments 56 to provide and maintain a cushion therealong, between the vehicle and the terrain.

The segments 57 are located along the sides 15 and 16 of the hull and are also of U-shaped configuration with outer walls 70, side walls 71 and 72, and tie backs 63 which are fastened to projections (not shown) on the outer walls 70, and to hull 11 as described for segments 56.

The bottom wall of membrane 50 at each segment 57, has an opening 53 of one inch diameter, to permit air under pressure from space 51 to flow downwardly and outwardly against walls 70 of segments 57 to provide and maintain an air cushion therealong, between the vehicle and the terrain.

The segments 58 which are located at the rear or stern 14 of the vehicle, are also of U-shaped configuration with outer walls 80, side walls 81 and 82, and closing faces 83, and tie backs 63 fastened to projections 84 on outer walls 80 and to the hull 11 as described above.

The bottom wall 50 at each segment 58 is provided with an opening 54 of one inch diameter to permit air under pressure to flow downwardly and outwardly from space 51 to provide and maintain an air cushion therealong between the vehicle and the terrain.

The combination of the inflatable member 48 and the segments 56, 57 and 58 causes the outer walls 60, 70 and 80 of segment 56, 57 and 58 to extend outwardly and provides a stiffer improved skirt regardless of the air cushion, which is not obtained with prior art structures and therefore permits a more uniform cushion to be maintained regardless of the speed or direction of travel of the vehicle 10.

The additional inclusion of the bottom wall 50 with its carefully selected and sized openings 52, 52A, 53 and 54 with the inflatable member 48 and segments 56, 57 and 58 provides the desired uniformity of air cushion at all points around the perimeter of the craft to prevent cushion decay and plough in.

Referring now more particularly to FIG. 11, an alternate embodiment of U-shaped skirt segment 100 is disclosed. The vehicle 10 includes a hull 11 with the downwardly extending flange 46 and an edge 47 of a tubular inflatable member 48 therein as previously described, which extends around the perimeter of the hull 11.

A panel 101 of a bottom wall or membrane 102 is engaged in the downward extending flange 46, extends down and around member 48, back to the hull 11, to which it is fastened in air tight well known manner thereby forming a space 51 with hull 11. The wall 102 is preferably constructed of air tight rubberized cloth and may be provided with a plurality of openings (not shown) to permit air under pressure to flow from space 51 outwardly and downwardly.

The segment 100 includes an outer wall 104 which is also engaged with hull 11 adjacent flange 46, is fastened to wall 102 and extends further around member 48 and downwardly forming a straight wall 10 that is angularly related with respect to membrane 102. Side walls 106 are provided integral with wall 105 and extend back to hull 11, to which they are fastened by tie backs 106 of well known type.

Figure 12:
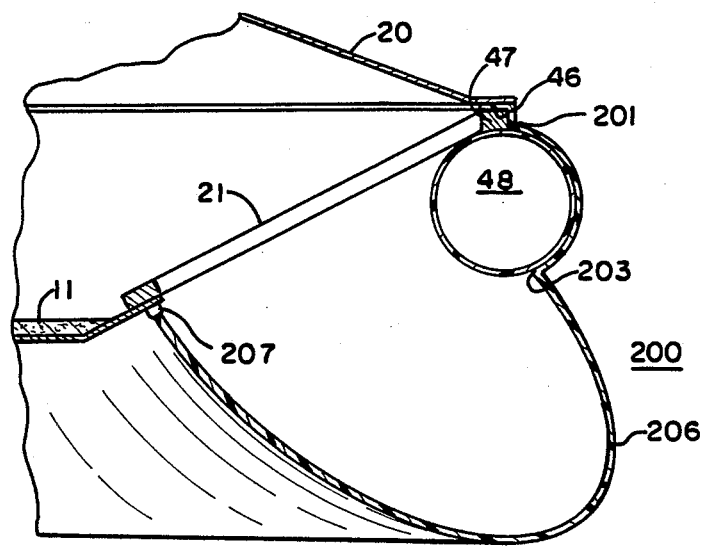
FIG. 12 is a view similar to FIG. 11 illustrating another version of skirt arrangement.
Figure 13:
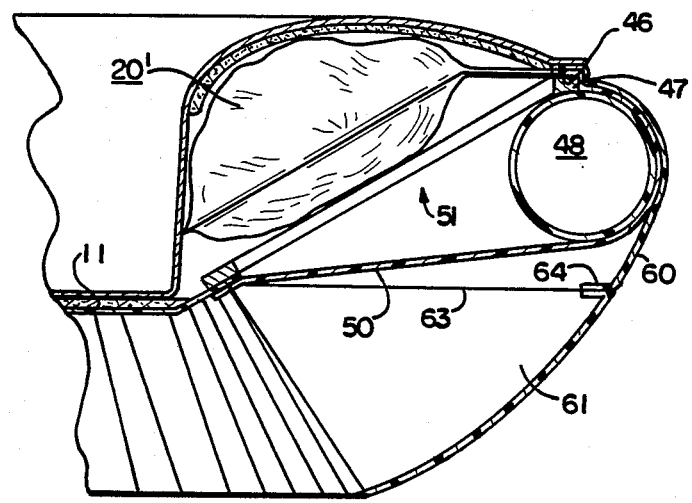
FIG. 13 is a view similar to FIG. 11 illustrating a portion of the ballast system and another version of skirt arrangement.
Figure 14:
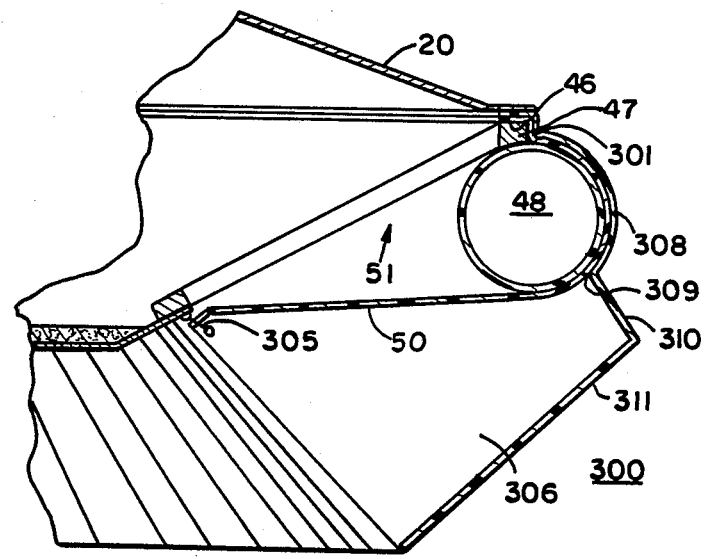
FIG. 14 is a view similar to FIG. 11 illustrating still another version of skirt arrangement.

Referring now more particularly to FIG. 12, an additional embodiment of skirt segment 200 is disclosed which is used with the vehicle 10 previously described, and wherein a panel 201 of segment 200 is fastened to hull 11 above the member 48. The segments 200 lacks the side walls of the previously described segments, is of balloon configuration and an end 207 of the wall 206 fastened to the hull 11, and has openings (not shown) in the wall 206 directed inwardly to provide for air flow and provide a resultant air cushion along the segments 200.

Figure 15:
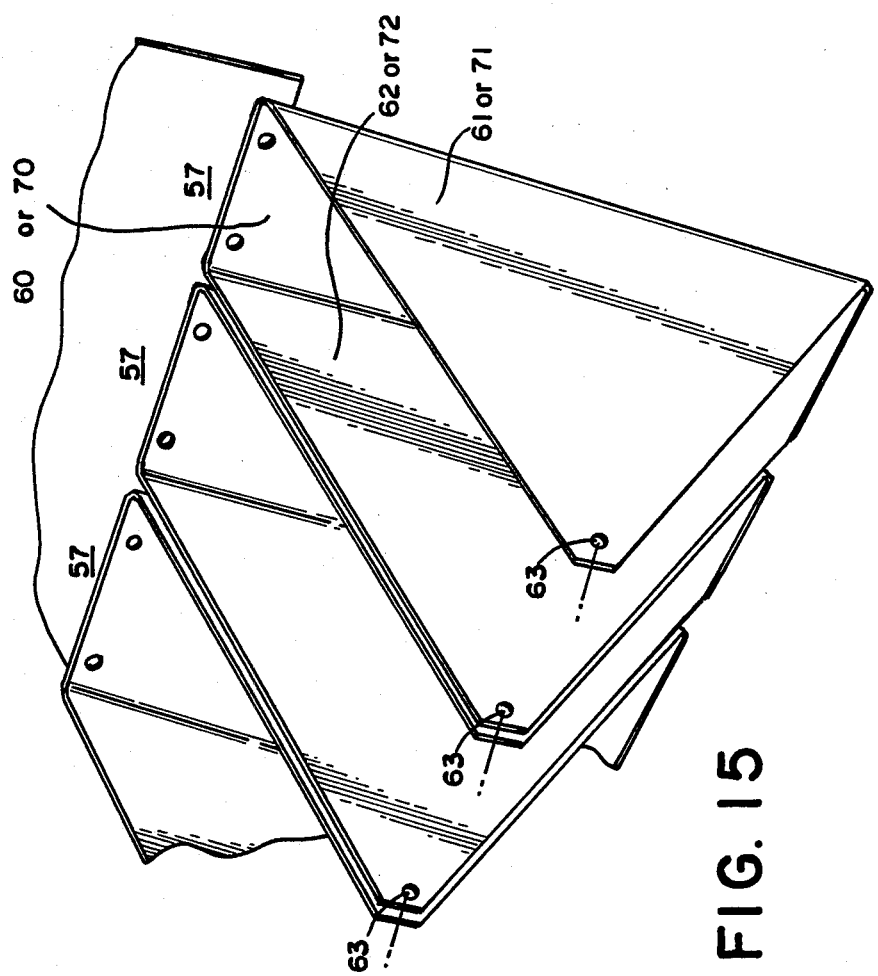
FIG. 15 is a perspective view of one version of skirt segment.

Referring now more particularly to FIG. 15, the embodiment of U-shaped skirt segment 300 is therein illustrated, and used with a vehicle 10 as previously described.

The segment 300 includes a wall 301 attached to the hull 11 adjacent flange 46 above member 48, and which extends down and around member 48 back to hull 11 to which it is fastened by tie backs 305 of well known type, and which forms one of the side walls 306 of the segment 300. An outer wall panel 308 is provided also fastened to hull 11, adjacent groove 46, above member 48, and which is secured to panel 301 and extends down and around member 48 to location 309. The panel 308 thence extends at a right angle at wall 310 to wall 311 which extends downwardly and inwardly perpendicular to wall 310 and towards the center of hull 11. The walls 301, 310 and 311 are forced outwardly by air flow as described above.

It will thus be seen that an air cushion vehicle has been provided in accordance with the objects of the invention.

We claim:

1. In an air cushion vehicle having a composite hull including an inflatable for buoyancy and a hard structure for containing the occupants, at least one ducted fan unit to provide air for vehicle movement and for a supporting air cushion, the improvement which comprises a self contained inflated tubular member attached to and extending around the perimeter of said hull;

said hull having openings therethrough in communication with said air from said ducted fan unit;

a plurality of skirt segment means attached to said perimeter of said hull above said tubular member supported by, and in contact with said tubular member;

said tubular member continuously urging said skirt segment means outwardly and upwardly;

said skirt segment means each including at least one outer wall extending around and under said tubular member towards the center of said hull; and at least one opening in said hull adjacent each of said skirt segment means whereby air under pressure is expelled downwardly to engage said outer wall and to form an air cushion for vehicle support.

2. An air cushion vehicle as defined in claim 1 in which membrane means are provided attached to said hull above said tubular member in contact with said tubular member, extending down and around said tubular member, back to said hull underneath said tubular member and forming a space therewith around the perimeter of said hull;

said hull openings are in communication with said space formed by said membrane; and at least one opening of selected size is provided in said membrane adjacent each said skirt segment means whereby air under pressure is expelled downwardly to engage each of said skirt segment outer walls.

3. An air cushion vehicle as defined in claim 1 in which said hull is of oval configuration with a bow, sides and a stern.

4. An air cushion vehicle as defined in claim 1 in which said vehicle includes a ballast bag;

a pump in communication with said ballast bag; and valve means for controlling said pump and permitting the flow of water into and out of said ballast bag for trimming said vehicle.

5. An air cushion vehicle as defined in claim 1 in which said skirt segment means are U-shaped skirts having two side walls and an outer wall.

6. An air cushion vehicle as defined in claim 3 in which said membrane openings around the perimeter of said hull are varied in size at the bow and side portion of said hull.

7. An air cushion vehicle as defined in claim 3 in which said membrane openings differ in number for skirt segments along said bow and said said sides.

8. An air cushion vehicle as defined in claim 1 in which said skirt segments are U-shaped skirts having two side walls, an outer wall and a closing face wall.

* * * * *

UNITED STATES PATENT AND TRADEMARK OFFICE
CERTIFICATE OF CORRECTION

PATENT NO. : 4,821,829

DATED : April 18, 1989

INVENTOR(S) : RONALD C. GILBERT and ROBERT R. HENVEST

It is certified that error appears in the above-identified patent and that said Letters Patent is hereby corrected as shown below:

Column 5,

Line 26, after "configuration", "and" should be

-- with --.

Column 3,

Line 58, after "hull", "I" should be -- II --.

Signed and Sealed this

Fourteenth Day of November, 1989

*Attest:*

JEFFREY M. SAMUELS

*Attesting Officer*     *Acting Commissioner of Patents and Trademarks*